United States Patent [19]
Gray

[11] Patent Number: 5,303,534
[45] Date of Patent: Apr. 19, 1994

[54] SEAL FOR DRIVE UNIT

[75] Inventor: Robert E. Gray, Conyers, Ga.

[73] Assignee: Fuqua Industries, McDounough, Ga.

[21] Appl. No.: 23,787

[22] Filed: Feb. 22, 1993

[51] Int. Cl.⁵ ............................................ A01D 34/00
[52] U.S. Cl. .................................................. 56/17.5
[58] Field of Search ................ 56/16.7, 17.5, 13.5, 56/12.7, 12.3, 10.8

[56] References Cited

U.S. PATENT DOCUMENTS

| | | | |
|---|---|---|---|
| 4,507,566 | 3/1985 | Leatherman et al. | 56/17.5 X |
| 4,583,504 | 4/1986 | Morris | 56/17.5 X |
| 4,981,120 | 1/1991 | Mangom, Jr. | 56/17.5 X |
| 5,070,686 | 12/1991 | Isaka et al. | 56/17.5 |
| 5,179,823 | 1/1993 | Pace | 56/16.9 |

*Primary Examiner*—Thuy M. Bui
*Attorney, Agent, or Firm*—Jones & Askew

[57] ABSTRACT

A drive mechanism for a lawn mower is proved which includes a pair of sealed ratchet mechanisms which provide improved resistance to wear and contamination.

3 Claims, 3 Drawing Sheets

SEAL FOR DRIVE UNIT

TECHNICAL FIELD

This invention relates in general to drive units for lawn mowers, and particularly relates to such units which have a seal configuration to allow moving parts to be easily and simply sealed from a hostile environment, and continuously lubricated.

BACKGROUND OF THE INVENTION

In lawn mowers, including walk-behind lawn mowers, it is often desirable to provide means for propelling the lawn mower other than by the user. Such lawn mowers are typically known as self-propelled lawn mowers. Although self-propelled lawn mowers have significant advantages, disadvantages arise in that such units tend to be costlier, heavier, and more difficult to maintain than comparable lawn mower which are not self-propelled. Therefore there is always a need to provide self-propelled lawn mowers which are less expensive, lighten, and easier to maintain.

SUMMARY OF THE INVENTION

The present invention provides a self-propelled lawn mower which is less expensive, lighter, and easier to maintain than similar mowers.

Therefore, it is an object of the present invention to provide an improved self-propelled lawn mower.

It is a further object of the present invention to provide a self-propelled lawn mower which is lighter in weight than comparable mowers.

It is a further object of the present invention to provide a self-propelled lawn mower which is more reliable than comparable mowers.

It is a further object of the present invention to provide a self-propelled lawn mower which is easier to maintain than comparable mowers.

It is a further object of the present invention to provide a self-propelled lawn mower which is simpler in operation than comparable mowers.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

General Construction and Operation

Reference is now made to the figures, in which like numerals correspond to various elements throughout the several views.

Figure 1:
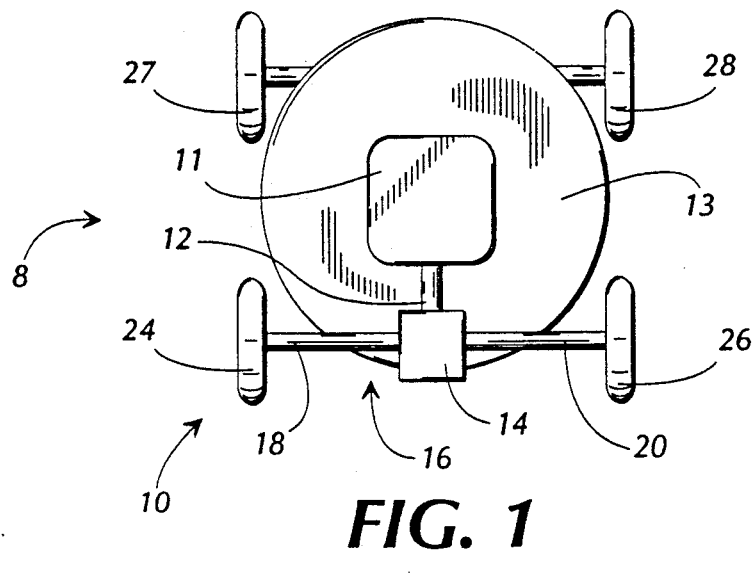
FIG. 1 is an illustrative view of a self-propelled drive construction.

The illustrative view provided by FIG. 1 illustrates a walk-behind, self-propelled lawn mower 8 (including a cutter housing 13) driven by a power mechanism 10 itself driven by a motor 11, which drives the drive axle 12 of the power mechanism 10. As may be understood, the motor 11 causes drive axle 12 to rotate, which causes the rear drive axle 16 to rotate, which causes wheels 24, 26 to rotate and drive the mower. Front wheels 27, 28 are not driven in this embodiment.

Figure 2:
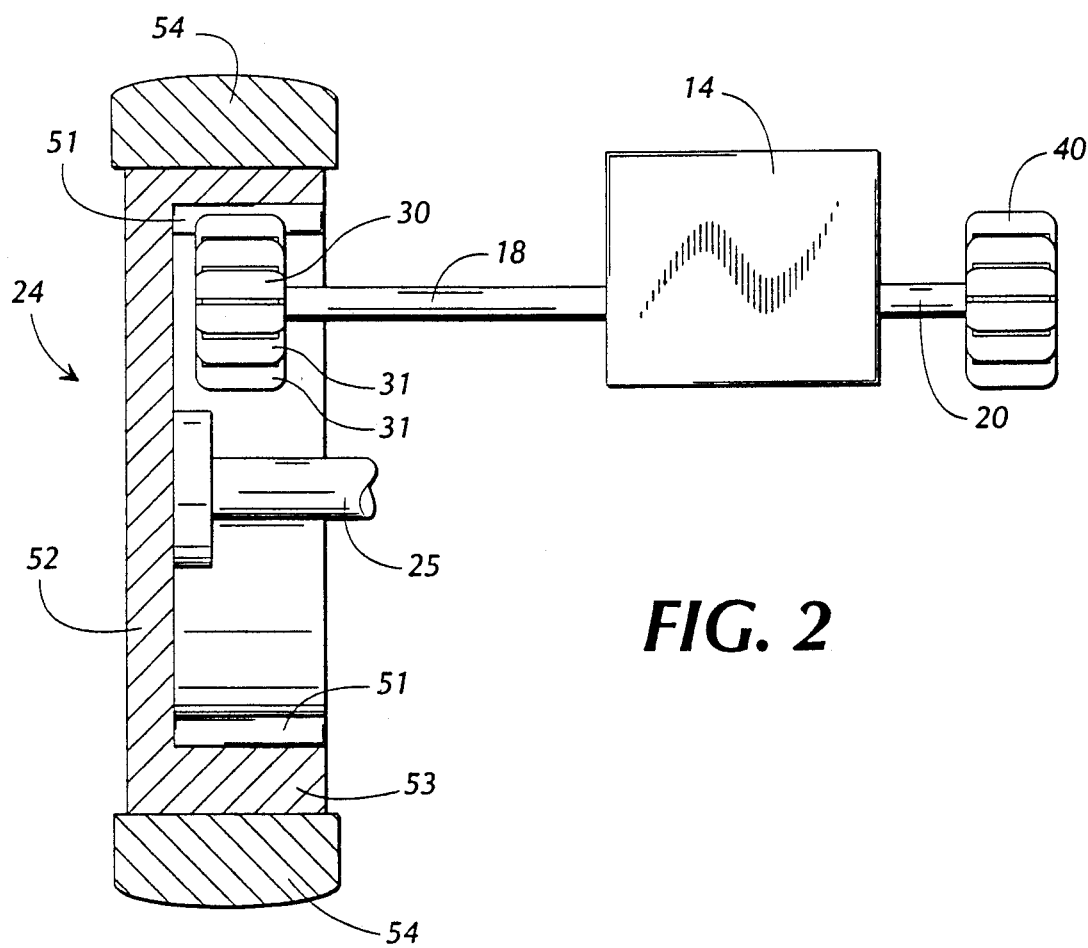
FIG. 2 is a more particular view of that shown in FIG. 1.

Referring now to FIG. 2, the power transmission mechanism 10 is illustrated. This mechanism 10 includes a drive axle 12, a gearbox 14, and a drive axle 16 (the rear axle in this embodiment) including a left portion 18 and a right portion 20. It may be understood that a front drive axle could also be used. The gearbox includes a multi-speed and clutch mechanism which is as known in the art.

The right portion 20 of the drive axle 16 always rotates at the same speed and direction as the left portion 18 of the drive axle, as in the embodiment shown the drive axle is a rigid piece, often called a "single" or "solid" axle.

The left portion 18 of the dri/e axle drives a left wheel 24, and the right portion 20 of the drive axle drives a right wheel 26, both through substantially similar ratcheting pinion gear configurations discussed in further detail below.

The Drive Pinions

Figure 3:
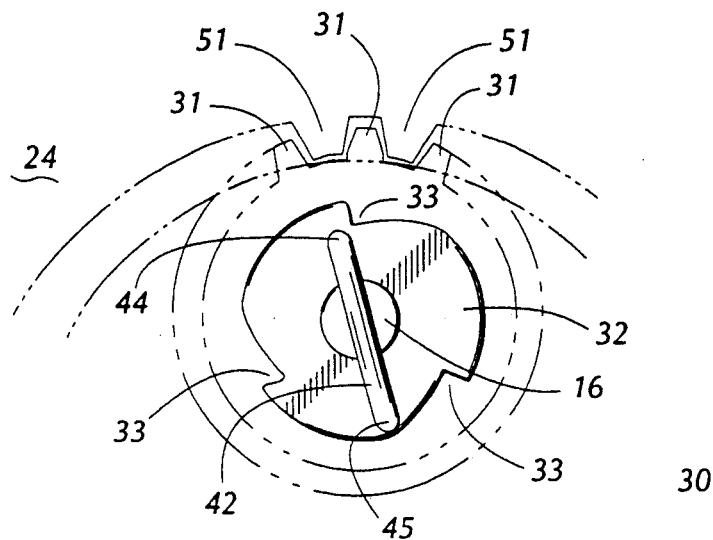
FIGS. 3 and 4 are views of a ratchet mechanism in operation. In this view, some of the teeth 31 of the gear 30 and some of the teeth 51 of the wheel 24 are shown in phantom.

Referring now to FIGS. 2 and 3, the particular drive means for the rear drive wheels 24, 26 is now discussed. As previously discussed, the right and left portions 14, 16, respectively of the drive axle 16 are driven by the gearbox 14. The drive axle is rotatably mounted to the frame of the mower 8 by bearings (not shown). Rotatably attached to the outer end of the left portion 18 of the drive axle is a left pinion gear 30, which may "ratchet" in one rotational direction relative to the left portion of the drive axle due to à ratcheting mechanism illustrated in further detail below.

Figure 4:
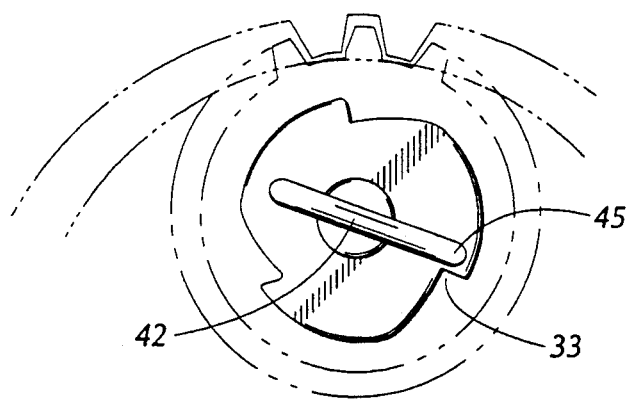

As may be seen in detail in FIGS. 2, 3 and 4, the radially-extending teeth 31 of the left pinion gear 30 engage and intermesh with the inwardly-directed teeth 51 of a ring gear portion of the left wheel 24, such that rotation of the left pinion gear 30 causes rotation (albeit at a lower rate) of the wheel 24 about an axis along the longitudinal axis of left wheel axle 25. The wheel 24 is mounted on a bearing on the axle 25.

The Use of Ratcheting Mechanisms with a Solid Axle

Referring now to FIG. 2, discussion is made of the construction and operation of the ratcheting pinion gear mechanisms which are driven by a single-piece axle.

In this type of ratchet mechanism, a pair of ratchet mechanisms are provided in order to provide a lesser-cost alternative to differential-driven pairs of drive wheels. As may be understood, differentials include many moving parts which can be expensive to purchase and maintain.

Operation of Ratchet

Figure 5:
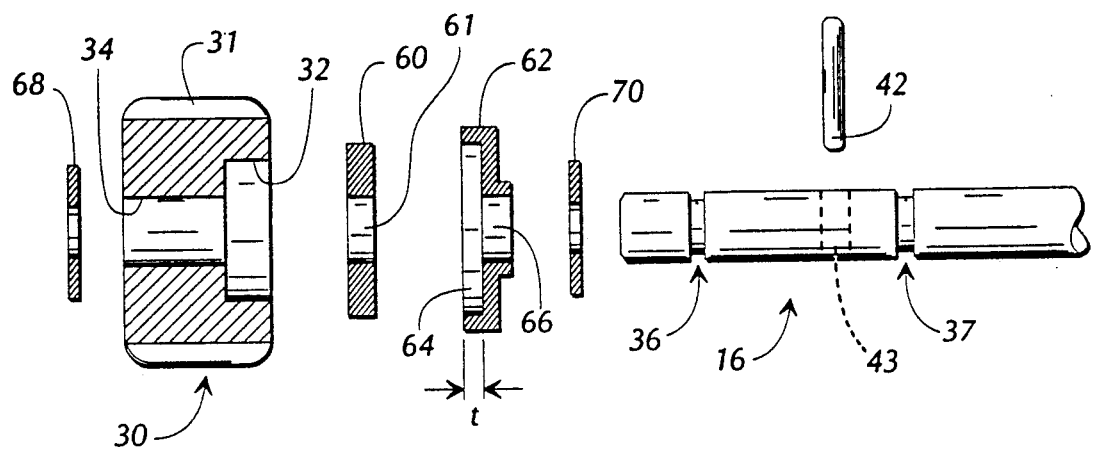
FIG. 5 is an exploded view of a ratchet mechanism including the seal.
Figure 6:
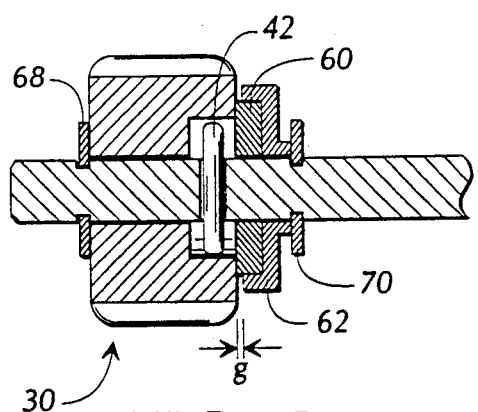
FIG. 6 is an assembled view of a ratchet mechanism including the seal.

Discussion of the ratchet mechanism is now made. Referring now also to FIGS. 5 and 6, the left pinion gear 30 defines in its inside face a circular cavity 32, within which inwardly extend a plurality of sloping teeth 33. Through the center bore 34 of the pinion gear 30 extends the free end of the left portion 18 of the rear drive axle.

In its assembled position, a pawl pin 42 having a first end 44 and a second end 45 is slidably mounted within a transverse bore 43 defined by the drive axle 16. This bore 43 has a longitudinal axis which is substantially transverse to the longitudinal axis of the left portion 18 of the rear drive axle, and preferably intersects said axis.

The pawl pin 33 provides the ratcheting action for the pinion gear assembly. When the ratcheting pinion gear assembly is assembled as shown in FIG. 6, the pawl pin 42 is positioned within the cavity 32 of the pinion gear 30.

Now referenceing FIGS. 3 and 4, it may be seen that the pawl pin is forced back and forth when the pinion gear 30 is rotated clockwise relative to the drive axle 16, as the pawl pin rides up the smooth-ramped side of the teeth. This will now be referred to as the "freewheeling" operational mode of the ratchet mechanism.

However, when the pinion gear 30 is rotated counter-clockwise relative to the drive axle 16, the teeth interfere with one of the ends of the pawl pin 42 (in this case end 45), and the pawl pin "locks" the drive axle 16 and the pinion gear 30 together, and thus the drive axle 16 drives the pinion gear 30 (thus driving its respective wheel 24). This will now be referred to as the "engaged" or "locked" operational mode of the ratchet mechanism.

It should be understood that the right side ratcheting mechanism is basically the "mirror-image" of the left side ratcheting mechanism, as will be better understood by the discussion below of the operation of the mower.

Operation of the Ratcheting Mechanisms

In typical operation of a lawn mower such as 8 in its "self-propelled" mode, the ratchet mechanisms only freewheel intermittently. For example, if an operator (not shown) starts the motor and engages the gearbox such that the drive axle is turning in its forward mode, and the operator does not turn or push the mower, the right and left ratcheting mechanisms will lock, and both rear wheels will be driven, thus driving the lawn mower.

However, if a left turn is made by the operator while the drive axle is turning, the user may push and turn the mower such that the right wheel turn at a rate faster that the drive axle. In this situation, the ratchet mechanism of the right wheel will convert to its freewheeling mode in order the allow the right wheel to spin relative to the drive axle, and the right wheel will not at that time be driven by the axle. At the same time, the drive axle will be driving the left wheel at its own rotational speed.

The ratchet mechanisms can ratchet in another mode, if desired. If the lawn mower is turned off, and the clutch (not shown) is still engaged, the operator can push the mower such that both ratchet mechanisms freewheel. This may be preferable in certain parking and storage applications where it is not preferred to start the mower or disengage the clutch.

The Seal

As may be understood, the ratchet mechanisms, including moving parts, can be exposed to unfavorable operating environments, such as dust particles, grass particles, as well as unfavorable weather conditions in or out of use. Therefore it has been found desirable to provide an improved environment for the ratchet mechanisms. Referring now to FIG. 5, a seal assembly according to the present invention is described. As previously discussed, the drive pinion gears 30, 40, each are mounted to the drive axle 16. Under the present invention, a seal assembly including a seal member 60 and a seal retainer 62 are also positioned on the drive axle 16. The seal member 60 is substantially circular, flat and includes a central hole 61 through which the drive axle 16 extends. In the preferred embodiment, the seal member 60 is a compressible felt washer.

The seal retainer 62 is likewise circular in shape and has a center hole 66, except that it is not flat but has a cavity 64. This cavity has a thickness "t" sufficient to concentrically enclose some, but not all of the thickness of the seal member when uncompressed, but more, and up to all, of the thickness of the washer when compressed in its installed position. This compression relationship will be discussed in detail below.

Installation/removal

Description of the seal assembly will be made in conjunction with its assembly procedure, in reference to FIGS. 5 and 6.

Firstly, axle 16 having a pair of turned-down annular notches or slots 36, 37, on each side of transverse pawl pin bore 43. An E-ring 70 (such as is known in the art) is then installed in notch 37, such that is attached to the axle 16 and cannot move along the length of the axle, although it may rotate about the longitudinal axis of the axle 16.

Seal retainer 62 and seal 60 are then installed on the axle 16. Pawl pin 42 is then installed within bore 43 of axle 16. The pinion gear 30 is then installed, such that the pawl pin 42 fits within its cavity 32. A second E-ring 68 is then installed as shown in FIG. 6.

It is very important to note that when the assembly of that shown in FIG. 6 is accomplished, the seal member 60 will be "squeezed" or "sandwiched" between the pinion gear 30 and the seal retainer 62 with a slight gap "g" between the outside edge of the seal retainer 62. This is very important in that the seal 60 tends to seal off cavity 32 of the pinion gear, which is preferable in that grease is applied to this cavity, to provide improved wear characteristics. The seal also reduces the risk of outside contamination from dust, dirt, etc. As may be understood, a seal is made along the marginal edge of the somewhat circular opening of the cavity 32, and a seal is made along the axle 16.

Removal of the above elements is substantially the reverse of installation.

Composition of Elements

The drive axle 18 is made of surface hardened medium carbon steel.

The pinion gears 30, 40 are made of powdered metal.

The wheel is composed of pneumatic rubber (for the tread portion), plastic (for the hub portion), and also includes a nylon bushing used as a bearing.

The pawl pin 42 is made of case hardened low carbon steel.

The seal member is made of #4103 felt. Rubber could also be used.

The seal retainer 62 is made of 6/6 Nylon.

The E-rings are typical.

Shell Alvania #2 lithium-based grease is used to lubricate the ratcheting mechanisms.

Alternatives

While this invention has been described in specific detail with reference to the disclosed embodiments, it will be understood that many variations and modifications may be effected within the spirit and scope of the invention as described in the appended claims.

What is claimed is:
1. A self-propelled lawn mower, comprising:
a motor;
a blade driven by said motor;
a drive axle also driven by said motor, said drive axle having a first and a second end;
a ratchet mechanism mounted on said axles including a ratcheted pinion gear;
a ratchet mechanism seal; and
a seal retainer comprising said seal against said pinion gear.

2. The mower as claimed in claim 1, wherein said seal is a felt seal and further comprising a lubricant lubricating said ratchet mechanism and sealed from the outside environment by said seal.

3. The mower as claimed in claim 1, wherein said ratchet mechanism seal is squeezed between said seal retainer and said ratchet mechanism when in its installed position.

* * * * *